(12) United States Patent
Zolotov

(10) Patent No.: US 6,731,730 B1
(45) Date of Patent: May 4, 2004

(54) METHOD AND SYSTEM FOR CREATING COMBINED CALL DETAIL RECORDS DATABASES (CDR) IN MANAGEMENT SYSTEMS OF COMMUNICATION NETWORKS

(75) Inventor: Moshe Zolotov, Tel-Aviv (IL)

(73) Assignee: Ectel Ltd., Petach Tikva (IL)

( * ) Notice: Subject to any disclaimer, the term of this patent is extended or adjusted under 35 U.S.C. 154(b) by 270 days.

(21) Appl. No.: 09/613,465

(22) Filed: Jul. 10, 2000

(30) Foreign Application Priority Data

Jul. 12, 1999 (IL) .................................................. 130894

(51) Int. Cl.[7] .......................................... H04M 15/00
(52) U.S. Cl. ................................... 379/126; 379/121.05
(58) Field of Search ........................ 379/111, 114.14, 379/121.01, 121.05, 126, 127.02, 134, 145

(56) References Cited

U.S. PATENT DOCUMENTS

| | | | |
|---|---|---|---|
| 5,008,929 A | | 4/1991 | Olsen et al. ................. 379/112 |
| 5,517,555 A | * | 5/1996 | Amadon et al. .............. 379/59 |
| 5,539,804 A | | 7/1996 | Hong et al. ................... 379/33 |
| 5,606,600 A | | 2/1997 | Elliott et al. ................ 379/112 |
| 5,732,127 A | * | 3/1998 | Hayes ........................ 379/115 |
| 5,793,853 A | * | 8/1998 | Sbisa ........................ 379/120 |
| 5,815,559 A | * | 9/1998 | Schnable .................... 379/112 |
| 5,832,068 A | * | 11/1998 | Smith ..................... 379/114.14 |
| 5,987,108 A | * | 11/1999 | Jagadish et al. ......... 379/114.01 |
| 6,052,447 A | * | 4/2000 | Golden et al. .............. 379/114 |
| 6,052,448 A | * | 4/2000 | Janning ................. 379/115.01 |
| 6,144,726 A | * | 11/2000 | Cross .................... 379/114.03 |
| 6,246,752 B1 | * | 6/2001 | Bscheider et al. ........ 379/88.22 |
| 6,249,570 B1 | * | 6/2001 | Glowny et al. .......... 379/88.22 |
| 6,249,572 B1 | | 6/2001 | Brockman et al. .......... 379/133 |
| 6,252,946 B1 | * | 6/2001 | Glowny et al. .......... 379/88.22 |
| 6,304,640 B1 | * | 10/2001 | Darland et al. ......... 379/114.03 |
| 6,327,350 B1 | | 12/2001 | Spangler et al. ........ 379/115.01 |
| 6,359,976 B1 | * | 3/2002 | Kalyanpur et al. .......... 379/134 |
| 6,381,306 B1 | * | 4/2002 | Lawson et al. ........... 379/32.01 |
| 6,385,301 B1 | * | 5/2002 | Nolting et al. ........... 379/32.01 |
| 6,400,813 B1 | * | 6/2002 | Birnhak ....................... 379/133 |
| 6,411,681 B1 | | 6/2002 | Nolting et al. ................ 379/34 |

* cited by examiner

*Primary Examiner*—Binh Tieu
(74) *Attorney, Agent, or Firm*—Nath & Associates PLLC; Harold L. Novick; Marvin C. Berkowitz

(57) ABSTRACT

A method and a system for building a Combined Call Detail Records data base (Combined CDR) in a management system of a telecommunications network, by collecting one or more call related events (real time Pre-CDRs) from the network with respect to a particular call by probes in real time, obtaining at least one off-line Call Detail Records data base (off-line CDR) from another system not belonging to the management system, and then integrating all the acquired data in a combined Call Detail Records data base (Combined CDR) of the management system, using computer means.

22 Claims, 3 Drawing Sheets

METHOD AND SYSTEM FOR CREATING COMBINED CALL DETAIL RECORDS DATABASES (CDR) IN MANAGEMENT SYSTEMS OF COMMUNICATION NETWORKS

FIELD OF THE INVENTION

The present invention relates to a method and a system of creating Call Detail Records databases (CDRs) suitable for novel management systems of modern telecommunications networks. There is a co-pending US patent application claming priority from an Israeli patent application No. 130893 filed Jul. 12, 1999.

BACKGROUND OF THE INVENTION

It is becoming more and more complicated to manage telecommunication networks in today's communication environment due to the increasing interconnectivity between networks of different type and owing to the appearance of additional types of Network Elements (NE) providing transport bearer and signaling capabilities. The term "bearer" should be understood as voice, fax or data signals to be transported through the network, while the term "signaling" covers service information transmitted in so-called signaling networks for proper handling the appropriate bearer.

A single call instance (voice, fax, etc.) may span a number of various networks and be handled by several types of Network Elements, as well as the signaling data on the call can be delivered via several different signaling protocols (e.g., an Intelligent Network call, a GSM call, etc.).

Collecting information on calls in real time and building data bases of Call Detail Records (so-called CDRs) is required for the functioning of various management systems in modern telecommunication networks. It should be mentioned that CDRs, built from data collected in real time, provide for multi-optional functioning of such management systems as a billing system, a fraud management system, a system for quality of service management and the like.

However, the management systems presently in use incorporate CDRs built in such a way that one source of information (say, a particular Network Element or a particular signaling system) is used for creating one CDR data base.

On the other hand, those skilled in the art are familiar with the problem that usually the information which can be collected in real time is incomplete, and therefore the required complementary information is to be obtained.

U.S. Pat. No. 5,606,600 describes processing of data, incorporated in call detail records (CDR) obtained from network switches, by a statistics engine. A so-called network information concentrator is introduced which collects, at a single point, call records from various network elements. This enables the concentrator to create data buffers of CDRs that are input to the statistics engine for processing. It is not described, however, how the call records are collected from different network elements, which information sources are used and how the data is integrated.

U.S. Pat. No. 5,008,929 describes a billing system for use in a telephone signaling network. The network includes signal transfer points (STPs) for receiving and routing message signaling units (MSUs), and a plurality of service control points (SCPs) linked to corresponding STPs. Each SCP comprises a database that includes call data provided by one or more of telephone companies participating in the network. The billing system comprises means for capturing at least a portion of the MSUs received by one or more STPs and processes thereof to produce usage data that indicates service recipients and service providers. The described system, however, concerns only the signaling information in the signaling network and is intended for billing only. The description fails to explain how data bases of different SCPs are integrated (combined).

SUMMARY OF THE INVENTION

It is therefore the object of the present invention to provide a novel method and an appropriate system for building combined CDR data bases useful for high level management systems (applications) in modem telecommunications networks. Such high level management systems are, for example, systems for Service management, Fighting Fraud, Quality of Service management, Network Protection, etc.

According to a first aspect of the invention, the above object can be achieved by providing a method for building a Combined Call Detail Records data base (Combined CDR) in a management system of a telecommunications network, comprising steps of:
  a) collecting one or more call related events from said network in real time with respect to a particular call, said call related events being real time Pre-CDRs;
  b) obtaining at least one Call Detail Records data base from a system being external to said management system, said Call detail Records data bases being off-line CDRs,
  c) integrating data produced at steps (a) and (b) thereby obtaining a combined Call Detail Records data base (Combined CDR) of said particular management system.

A billing system, a billing collector or the like may serve as examples of the external system mentioned above. The billing collector (mediator), contrary to the billing system, does not implement an algorithm of charging subscribers and deals with accumulating billing data on calls which have been completed. The mediator can be adapted to collect such data for example, from one or more network elements like switches, which hold data bases on the completed calls.

Preferably, step (a) of the above method further comprises building of at least one real-time Call Detail Records data base (real-time CDR) using said call related events (Pre-CDRs) collected from said network in real time with respect to a particular call.

In the modern telecommunication networks, a single real-time CDR usually relates to a call spanning more than one of so-called component networks, handled by several types of Network Elements connected by network links; data on such a call being delivered via several different signaling protocols (e.g. an Intelligent Network call, a GSM call, etc.).

The real-time Pre-CDRs can be collected by probes, preferably by so-called Front End System Probes, non-intrusively connected to the network links via so-called Interface Points, wherein the links connect between the network elements (NE). These links may carry all sorts of a bearer (e.g. voice, fax, data), in-band and out-of-band signaling, or a combination of a bearer and a signaling.

As mentioned above, the real-time Pre-CDRs respectively relate to unique events associated with a call as collected from the links. A real-time CDR is an aggregation of all Pre-CDRs associated with a single call instance.

In the described method, the step (a) of collecting the call related events (so-called Pre-CDRs) from the network can be accomplished as follows:

applying one or more probes to a number of network links for obtaining input information form said links;

processing the input information by said plurality of Interface Handlers (IH), capable of handling a variety of respective interfaces mapped to different links in the telecommunication network;

applying a plurality of Protocol Parsers (PP) capable of handling a variety of protocols, wherein each said Protocol Parser handles a single protocol type.

Initial processing of the input information may be provided by the probes using said IH and PP, though building of the real-time CDRs may be performed with the aid of a computerized means provided with a processor and a memory means.

According to the preferred version of the method, it comprises applying a CDR Builder program for constructing real time CDRs from the Pre-CDRs, for further storing said real-time CDRs in the memory.

The real-time CDRs relevant to the management system of interest are to be stored in the memory means for further combining with the off-line CDRs. Optionally, the method may comprise a step of storing at least some of the call related events (Pre-CDRs) for further processing.

Unlike the real-time Pre-CDRs and CDRs, a single off-line CDR is usually related to a completed call instance in one component network of said telecommunications network; such an off-line CDR can be generated by a single network element, such as a gateway or a switch in a central office which creates a data base of local calls.

Usually, the off-line CDRs are received from the external systems via file or batch transfer mechanisms.

As a rule, the off-line CDRs are formatted in order to comply with the real-time management system's data presentation level.

Further, the method comprises a step of sorting the off-line CDRs by means of a so-called discriminator. The discriminator enables discarding non-required (i.e., irrelevant for the management systems of interest) off-line CDRs according to one or more pre-defined manageable parameters (such as origination/destination IDs, Links/Trunks Ids, type of CDR, etc.). For example, in a particular Fraud Management system, off-line CDRs of long-distance calls may be excluded.

The combining step (c) includes applying a CDR Integrator program comprising manageable Integration rules stored in the memory of the computerized means.

The CDR integrator, operating whenever data is received or based on a pre-determined schedule, will integrate the real-time and off-line CDRs into Combined CDRs. Association of CDRs will be carried out according to the Integration Rules which indicate the matching criteria for each combination of CDRs, such as: calling ID, called ID, other ID, time stamp, service type, etc. The Integration rules comprise, for example, the following: a) incorporating in the combined CDR the off-line CDRs collected by a particular switch (e.g., off-line CDRs stored in the local switch, for further filtering therefrom only CDRs on local calls); b) combining real-time CDRs and off-line CDRs with a specified destination ID; c) completing information if a component real-time CDR is absent or damaged; the completion of information can be provided by using one or more other real-time CDRs and/or by adding off-line CDRs comprising data relating to the manageable parameters; etc.

According to a second aspect of the invention, there is provided a system for building a Combined Call Detail Records data base (Combined CDR) in a management system of a telecommunications network, the system comprising:

one or more probes capable of collecting call-related events from said network in real time with respect to a particular call, said call related events being real time Pre-CDRs;

computerized means comprising a processor and a memory and being adapted to receive data from said one or more probes in real time, and to receive off-line one or more Call Detail Records data bases from a system being external to said management system, said Call detail Records data bases being off-line CDRs, said computer means being provided with hardware and software means capable of integrating data received both in real-time and off-line, to produce a combined Call Detail Records data base (Combined CDR).

The external system may be , for example, a billing system, a billing collector or the like. The off-line CDR will therefore be a billing CDR obtained off-line, via a separate communication line.

The telecommunication network should preferably be understood as a number of component networks comprising several types of Network Elements connected by network links; data on such a call being delivered via several different signaling protocols.

The one or more probes being connected to said network links via so-called Interface Points, the links belonging either to the same or to different said component networks.

The mentioned probes are preferably so-called Front End System Probes (FES) non-intrusively connected to the network links via so-called Interface Points, wherein the links connect between the network elements (NE). For example, the FES is similar to TRP-360 of ECTel Ltd., Israel.

According to the preferred embodiment of the invention, said computerized means is capable of:

building at least one real-time Call Detail Records data base (real-time CDR) using said call related events (Pre-CDRs) collected from said network in real time with respect to a particular call, based on Events Correlation Definitions stored in the memory means, integrating the real-time CDRs and the off-line CDRs into said Combined CDRs based on Integration Rules stored in the memory means.

In a particular case, said computerized means are provided with the following hardware and software modules:

a plurality of interface handlers (IH) capable of handling a variety of interfaces in cooperation with said probes;

a plurality of protocol parsers (PP), capable of processing a variety of signaling protocols, wherein each of said PP handles a single protocol type;

said HP and PP being compatible with said probes to produce said real-time Pre-CDRs;

one or more formatters for formatting said off-line CDRs before combining;

at least one discriminator capable of sorting the off-line CDRs before combining;

a CDR builder intended for building said real-time CDRs and comprising tables of Events Correlation Definitions;

a CDR integrator intended for combining said real-time CDRs with said off-line CDRs and comprising tables of Integration Rules.

BRIEF DESCRIPTION OF THE DRAWINGS

The invention will further be described using a number of embodiments with reference to the following non-limiting drawings in which.

DETAILED DESCRIPTION OF THE PREFERRED EMBODIMENTS

Figure 1:
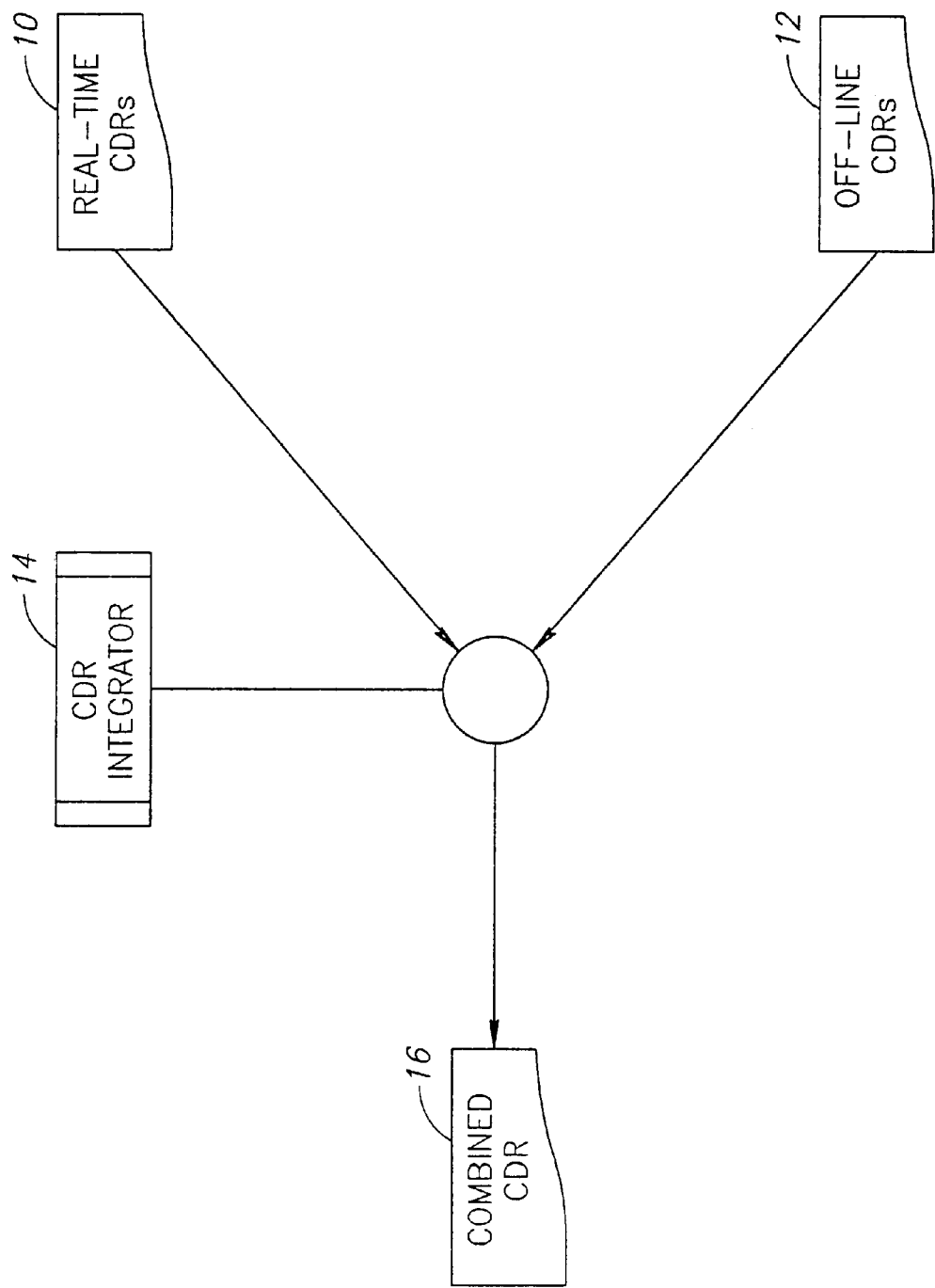
FIG. 1 is a pictorial representation illustrating a method for building a Combined CDR according to the invention.

FIG. 1 presents a schematic explanation of the method for building combined CDRs for management systems of telecommunications networks. According to the method, Call Detail Records of various scales which are obtained from the network in real time (marked real-time CDRs 10) are combined with Off-line Call Detail Records (marked off-line CDRs 12) obtained from an external management system or application. The combining is provided with the aid of a specific CDR Integrator program 14 to produce a combined CDR 16 which is intended for another, or a higher level application of the management system.

Figure 2:
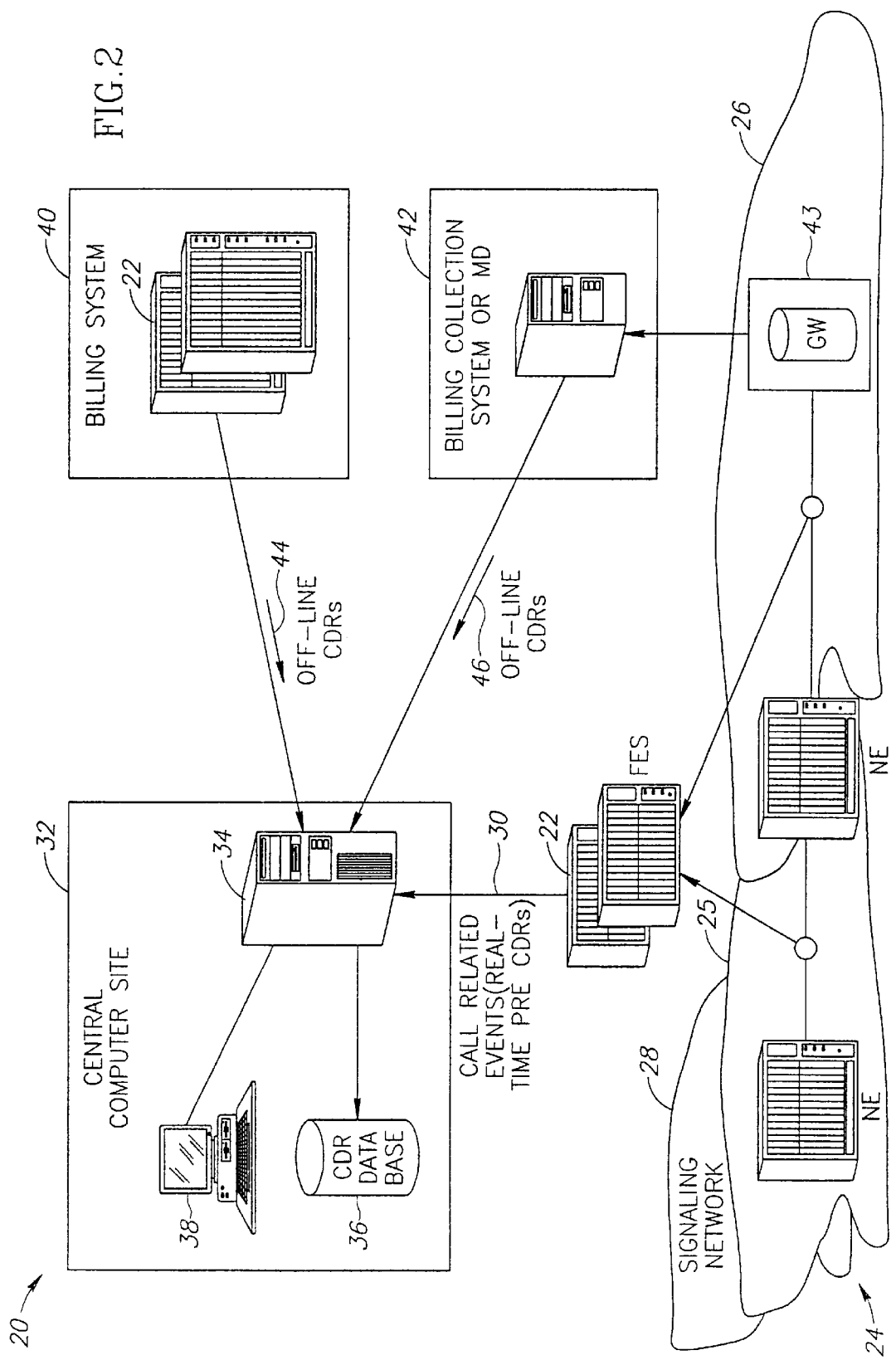
FIG. 2 schematically illustrates a system for combining real-time and off-line data into a common CDR data base.

FIG. 2 schematically illustrates the system 20 according to the invention, comprising a number of probes 22 (preferably, Front End System probes of ECTel® Ltd., Israel) obtaining data from a network 24, and forwarding it to a Central Computer site 32 for processing. The network 24 is shown as consisting of a telephone network 25 (for example, a conventional PSTN network), an adjoining network marked 26 (say, Voice over IP) and a signaling network marked 28. Such a probe can be connected to one or more links between particular network elements (NE) in the networks 25, 26 and 28, i.e. to one or more interface points in the network, and is adapted to non-intrusively collect call related events from the interface points in real time. For example, some of the call related events (Pre-CDRs 30) may be obtained from telecommunication links carrying a bearer (for instance, a pre-DCDR being classification of the bearer). Other call related events (e.g., time stamp, identification data on the call's origin and destination, etc.) may be picked out using either out-of-band (28) or in-band signaling and their appropriate protocols.

The call related events 30 are sent in real time to a central computer site 32 provided with a processor (computer) 34, a memory including that intended for storing CDR data bases (marked 36) and a display 38. In this example, the processor 34 is also connected to an external billing system 40 and to an external billing collection system (or a mediation device MD) 42. The mediator 42 collects data from one or more network elements (only one such element is shown—a gateway 43 with its internal database)

Both of the external systems are adapted to transfer so-called off-line CDRs 44 and 46 i.e., complementary Call Detail Records to the central computer site 32. The transfer can be accomplished whenever the off-line CDRs are created in these external systems, or according to any other agreed schedule. The computer 34 takes care of processing the real-time Pre-CDRs 30 together with the off-line CDRs 44 and 46 to build a combined CDR.

Figure 3:
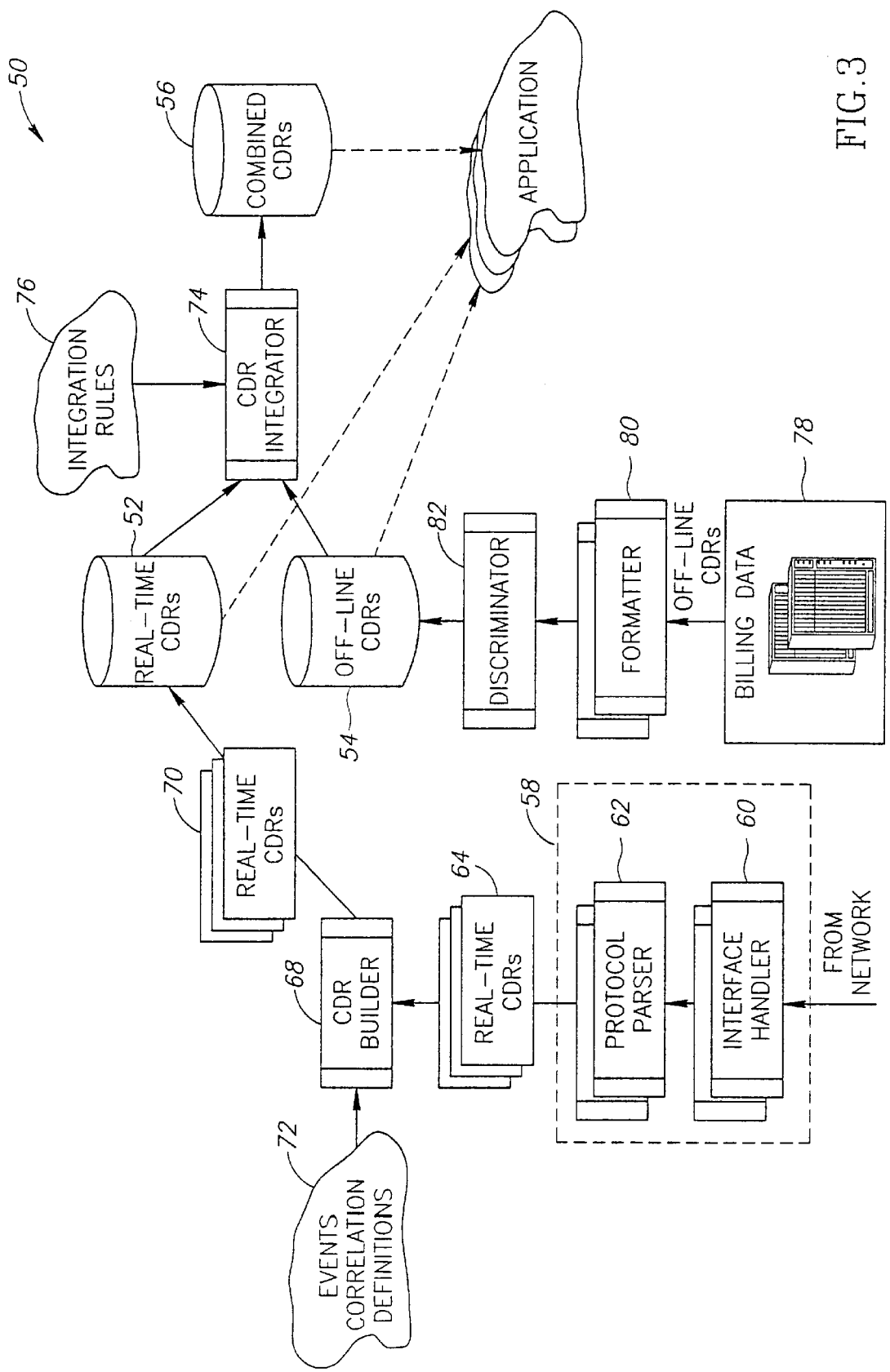
FIG. 3 illustrates a pictorial representation of one embodiment of the system shown in FIG. 2, drawn in more detail.

FIG. 3 is a block-diagram illustrating, in more detail, one embodiment of the method and the system of the invention.

A system 50 is intended for combining real time CDRs (stored in a memory block 52) and off-line CDRs (stored in a memory block 54) into one or more Combined CDRs (shown as a memory block 56). In the figure, the real-time CDRs and the off-line CDRs are associated with different applications of the common management system of the telecommunications network, for example with its signaling system and billing application, respectively. The resulting, Combined CDRs correspond to yet another application, preferably of a higher level one, such as a Fraud Management application or a Quality of Service management application.

For creating real time CDRs, Front End System Probes (one FES probe is shown schematically and marked 58) are interfaced to various interface points in the network.

In this particular embodiment, the FES probe 58 comprises modules of Interface Handler 60 and Protocol Parser 62 which serve as "filters" intended for picking out the required call related events (Pre-CDRs) from information which the FES probes perceive. Specific Interface Handlers cater for variety of interfaces mapped to different links in the Network. Input information in the form of signaling and bearer data is received and processed by a single Interface handler 60 suitable for the interface point in use. Protocol Parsers 62 process a variety of signaling protocols interfaced by the Front End System Probe. Each Protocol Parser handles a single protocol type. The process of combined processing the input information concerning one and the same call and obtained from different data sources (via one or more probes), yields the comprehensive real-time Pre-CDRs 64 which relate to unique events associated with the call as collected from the links.

The Pre-CDRs 64 are handled by a CDR Builder 68 which is responsible for generating real-time CDRs 70. Preferably, one real-time CDR is created for the call related events obtained from one particular data source and related to one telecommunications protocol. Generation of real-time CDRs is performed according to Events Correlation Definitions 72 indicating to the CDR Builder 68 which events should be integrated into the real-time CDRs 70. The Definitions 72 are pre-selected rules which determine the association or linkage between various call related events, for example a rule of non-redundant merging the events using such parameters related to a call, as origin and destination identifications, time stamp, duration of the call, link/trunk ID, bearer type, etc. The definitions can be manually or automatically entered in the computer memory of the system. A real-time CDR is an aggregation of all Pre-CDRs associated with a single call instance. The CDR Builder 68 constructs CDRs from Pre-CDRs, and controls the storing of the real-time CDRs in the memory block 52.

A single off-line CDR is usually related to a completed call instance in one network, generated by a single network element. The Off-line CDRs received from an external system such as a Billing Data external application (usually via file transfer or transactional mechanism) are formatted by a formatter 80 in order to comply with the system's data presentation level. A discriminator 82 enables discarding of non-required off-line CDRs according to one or more pre-defined manageable parameters (such as origination/destination IDs, Links/Trunks Ids, type of CDR, etc.). For example, data calls CDRs are unnecessary for the Combined CDR, if it is intended for a Service of Voice management application. The Combined CDRs 56 are formed by a CDR Integrator 74. The CDR Integrator operates whenever the off-line data is received. Each of the combined CDRs 56 is built from one or more real-time CDRs obtained from block 52 and one or more off-line CDRs selected from the buffer 54. The assembling of the combined CDRs is carried out according to the manageable and adjustable Integration Rules 76 stored in a specific table in the memory means (not shown). The Rules indicate, for each combination of CDRs, what are the matching criteria, such as: calling ID, called ID, other IDs, time stamp, service type, etc.

The Combined CDRs are intended for higher level management applications of the modern telecommunications networks, for example, for the applications in the areas of Service management, Fraud Management, Quality of Service management, Network Protection and so on. Such a novel kind of integration (i.e. creating the Combined CDRs) evolves CDRs generated for calls which take place on variety of telecommunication networks or any combination of networks, such as: PSTN (national/international), Mobile, IP, ATM and so on.

The integration of different types of CDR into a combined CDR will enable such a high level management application to:

Omit data redundancies,

Complement the missing data,

Restore damaged CDRs, if any, thereby rendering such a management system more reliable, accurate and universal.

Whilst the invention has been described with particular reference to some preferred embodiments, it should be appreciated that modifications will be apparent to those skilled in the art and the invention contemplates such modifications as fall within the scope of the appended claims.

What is claimed is:

1. A method for building a Combined Call Detail Records data base (Combined CDR) in a management system of a telecommunications network, comprising steps of:
   a) collecting one or more call related events with respect to a particular call from two or more data sources associated with said network, at least one of said data sources being a source of signaling data and at least another of said sources being a non-signaling bearer source of non-signaling data, by one or more probes and in real time, said call related events being real time Pre-CDRs;
   b) obtaining at least one Call Detail Records data base from a system being external to said management system, said Call detail Records data bases being off-line CDRs,
   c) integrating data produced at steps (a) and (b) thereby obtaining a combined Call Detail Records data base (Combined CDR) of said management system.

2. A method according to claim 1, wherein said external system is a billing system or a billing collector.

3. A method according to claim 1, wherein at least one of said off-line CDRs is obtained from a single network element and comprises data on completed calls.

4. A method according to claim 1, wherein step (a) further comprises building of at least one real-time Call Detail Records data base (real-time CDR) using said call related events (Pre-CDRs) collected from said network in real time with respect to a particular call.

5. A method according to claim 3, wherein said real-time CDR is an aggregation of all Pre-CDRs associated with a single call instance.

6. A method according to claim 1, wherein step (a) of collecting the call related events (Pre-CDRs) from the network is accomplished as follows:

applying said one or more probes to a number of network links for obtaining input information from said links;

processing the input information by a plurality of Interface Handlers (IH), capable of handling a variety of respective interfaces mapped to different links in the telecommunication network;

applying a plurality of Protocol Parsers (PP) capable of handling a variety of protocols, wherein each said Protocol Parser handles a single protocol type.

7. A method according to claim 6, wherein step (a) comprises initial processing of the input information by the probes using said IH and PP, and building of real-time CDRs with the aid of a computerized means provided with a processor and a memory means, by applying a CDR Builder program for constructing real time CDRs from the Pre-CDRs and further storing said real-time CDRs in the memory means.

8. A method according to claim 1, wherein said off-line CDRs are received from the external systems upon formatting thereof.

9. A method according to claim 8, comprising a step of sorting the off-line CDRs by means of a discriminator.

10. A method according to claim 1, wherein said step c) includes applying a CDR Integrator program comprising manageable Integration rules for obtaining a Combined CDR comprising complete data for a particular management system.

11. A method according to claim 1, wherein said management system is a Fraud management system.

12. A method according to claim 1, wherein said management system is a Quality of Service management system.

13. A system for building a Combined Call Detail Records data base (Combined CDR) in a management system of a telecommunications network, the system comprising:
   one or more probes capable of collecting call-related events from two or more data sources associated with said network in real time with respect to a particular call, at least one of said data sources being a source of signaling data and at least another of said sources being a non-signaling bearer source of non-signaling data, said call related events being real time Pre-CDRs;
   computer means comprising a processor and a memory and being adapted to receive data from said one or more probes in real time, and to receive off-line one or more Call Detail Records data bases from one or more systems being external to said management system, said Call detail Records data bases being off-line CDRs,
   said computer means being provided with hardware and software means capable of integrating data received both in real-time and off-line, to produce a combined Call Detail Records data base (Combined CDR).

14. A system according to claim 13, wherein said one ore more external systems comprises at least one component from a non-exhausting list including a billing system, a billing collector, a network element; said external systems being adapted to transfer said off-line CDRs via separate communication lines.

15. A system according to claim 13, wherein said telecommunication network comprises a number of component networks comprising several types of Network Elements connected by network links; data collected from said links being delivered via several different signaling protocols.

16. A system according to claim 15, wherein said one or more probes are connected to said network links via Interface Points, the links belonging either to the same or to different said component networks.

17. A system according to claim 16, wherein said probes are Front End System Probes (FES) non-intrusively connected to the network links.

18. A system according to claim 17, wherein said FES probe is TRP-360 of ECTel® Ltd., Israel.

19. A system according to claim 13, wherein said computer means is capable of:

building at least one real-time Call Detail Records data base (real-time CDR) using said call related events (Pre-CDRs) collected from said network in real time with respect to a particular call, based on Events Correlation Definitions stored in the memory means, integrating the real-time CDRs and the off-line CDRs into said Combined CDRs based on Integration Rules stored in the memory means.

20. A system according to claim 13, wherein said computer means are provided with the following hardware and software modules:

a plurality of interface handlers (IH) capable of handling a variety of interfaces in cooperation with said probes;

a plurality of protocol parsers (PP), capable of processing a variety of signaling protocols, wherein each of said PP handles a single protocol type;

said HP and PP being compatible with said probes to produce said real-time Pre-CDRs;

one or more formatters for formatting said off-line CDRs before combining;

at least one discriminator capable of sorting the off-line CDRs before combining;

a CDR builder intended for building said real-time CDRs and comprising tables of Events Correlation Definitions;

a CDR integrator intended for combining said real-time CDRs with said off-line CDRs and comprising tables of Integration Rules.

21. A method for building a Combined Call Detail Records data base (Combined CDR) in a management system of a telecommunicating network comprising steps of:

(a) collecting one or more call related events with respect to a particular call from two or more data sources in said network in real time, said call related events being real time Pre-CDR's, and wherein at least one of said data sources is a source of signaling data, and at least another of said data sources is a non-signaling bearer source of non-signaling data;

(b) obtaining at least one Call Detail Records data base from a system being external to said management system, said at least one Call Detail Records data base being an off-line CDR;

(c) integrating data produced at steps (a) and (b) thereby obtaining a combined Call Detail Records data base (Combined CDR) of said management system.

22. A system for building a Combined Call Detail Records data base (Combined CDR) in a management system of a telecommunicating network, the system comprising:

one or more probes capable of collecting call-related events from two or more data sources in said network in real time, with respect to a particular call, wherein said call related events being real time Pre-CDR's, and wherein at least one of said data sources is a source of signaling data, and at least another of said data sources is a non-signaling bearer source of non-signaling data;

computer means comprising a processor and a memory and being adapted to receive data from said one or more probes in real time, and to receive off-line one or more Call Detail Records data bases from one or more system being external to said management system, said one or more Call Detail Records data bases being an off-line CDR;

said computer means being provided with hardware and software means capable of integrating data received both in real-time and off-line, to produce a combined Call Detail Records data base (Combined CDR).

* * * * *